US008270953B2

(12) United States Patent
Klassen et al.

(10) Patent No.: US 8,270,953 B2
(45) Date of Patent: Sep. 18, 2012

(54) SYSTEM AND METHOD FOR AUTOMATICALLY DRAFTING A BLOG ENTRY

(75) Inventors: Gerhard Dietrich Klassen, Waterloo, CA (US); Brandon James DeHart, Campbell River, CA (US); Terrill Mark Dent, Waterloo, CA (US)

(73) Assignee: Research In Motion Limited, Waterloo Ontario (CA)

( * ) Notice: Subject to any disclaimer, the term of this patent is extended or adjusted under 35 U.S.C. 154(b) by 0 days.

(21) Appl. No.: 13/457,124

(22) Filed: Apr. 26, 2012

(65) Prior Publication Data

US 2012/0214438 A1 Aug. 23, 2012

Related U.S. Application Data

(63) Continuation of application No. 12/464,531, filed on May 12, 2009, now Pat. No. 8,175,583.

(60) Provisional application No. 61/052,444, filed on May 12, 2008.

(51) Int. Cl.
*H04M 3/42* (2006.01)
(52) U.S. Cl. ............... 455/414.1; 455/414.2; 348/207.1; 707/104.1
(58) Field of Classification Search ............... 455/414.1, 455/414.2
See application file for complete search history.

(56) References Cited

U.S. PATENT DOCUMENTS

| | | | |
|---|---|---|---|
| 7,069,003 B2* | 6/2006 | Lehikoinen et al. | 455/414.2 |
| 2005/0075097 A1* | 4/2005 | Lehikoinen et al. | 455/414.1 |
| 2005/0138067 A1* | 6/2005 | Billsus et al. | 707/104.1 |
| 2006/0284981 A1* | 12/2006 | Erol et al. | 348/207.1 |
| 2007/0106627 A1* | 5/2007 | Srivastava et al. | 706/20 |
| 2007/0162845 A1* | 7/2007 | Cave et al. | 715/530 |
| 2009/0042545 A1* | 2/2009 | Avital et al. | 455/414.1 |
| 2010/0149347 A1* | 6/2010 | Kim et al. | 348/207.1 |
| 2011/0040604 A1* | 2/2011 | Kaib et al. | 705/10 |

FOREIGN PATENT DOCUMENTS

JP 2006301884 A * 11/2006

OTHER PUBLICATIONS

Pujianto C et al: "Towards Automatic Mobile Blogging" IEEE International Conference in Multimedia, Jul. 1, 2006, pp. 2033-2036, XP031033265, ISBM: 978-1-4244-0366-0 p. 2034, left column, para. 1; p. 2035, left column; figs. 2 5.
William Bamford et al., "Location-based Mobile Blogging", ICTTA '06, vol. 1, Apr. 24, 2006-Apr. 28, 2006, pp. 111-116, XP002552083, ISBM: 978-0-7803-9521-3.

(Continued)

*Primary Examiner* — Charles Shedrick
(74) *Attorney, Agent, or Firm* — Jon A. Gibbons; Fleit Gibbons Gutman Bongini & Bianco PL

(57) ABSTRACT

There is disclosed a system and method for automatically drafting blog entries. In an embodiment, the method comprises: defining a triggering event for generating a draft blog entry; detecting the triggering event; and upon detection of the triggering event, automatically generating a draft a blog entry in a predetermined format. The triggering event may comprise, for example, capturing an image, video clip, sound clip, or a browsing a webpage having a URL on the wireless mobile device, and the method may further comprise automatically inserting the captured image, video clip, sound clip, or URL into the draft blog entry in the predetermined format together with automatically generated text. Some of the text may be generated in dependence upon the triggering event.

26 Claims, 10 Drawing Sheets

OTHER PUBLICATIONS

European Search Report, Application No. EP 09160072.6, Sep. 15, 2009.

Summons to attend oral proceedings mailed by EPO dated Aug. 20, 2010, Application No. 09160072.6.

* cited by examiner

SYSTEM AND METHOD FOR AUTOMATICALLY DRAFTING A BLOG ENTRY

CROSS-REFERENCE TO RELATED APPLICATIONS

This application claims the benefit of U.S. patent application Ser. No. 12/464,531, filed on May 12, 2009, now U.S. Pat. No. 8,175,583, which claims the benefit of Provisional Patent Application No. 61/052,444 filed May 12, 2008, the disclosure of which of each is incorporated herein by reference in their entirety.

BACKGROUND

The present disclosure relates generally to "weblogs" or "blogs", and more particularly to systems and methods for drafting blog entries.

A "weblog" or "blog" generally refers to a webpage or website maintained by a writer or "blogger" who updates the webpage or website with new blog entries. The blogger may express his/her thoughts and ideas in individual blog entries, and publish those blog entries for access by readers virtually worldwide via the Internet. More recently, the popularity of blogs and blogging has increased to the point that virtually anyone with Internet access and a desire to publish his/her thoughts can start and maintain a blog on virtually any subject. Typically, blog entries are presented in reverse chronological order, with the most recent blog entry appearing at the top of a list of such blog entries. Individual blog entries may be text-based, or a combination of text and photos, and may also include various links to audio, video, or audiovisual multimedia. The blog webpage may also accept comments from readers which may be posted to the blog. While many blogs are accessible to the general public, other blogs may be accessible only to a limited number of authorized participants.

DETAILED DESCRIPTION

The present disclosure relates to a system and method for blogging. More particularly, the present disclosure describes a system and method for automatically drafting blog entries in response to a triggering event.

Figure 1:
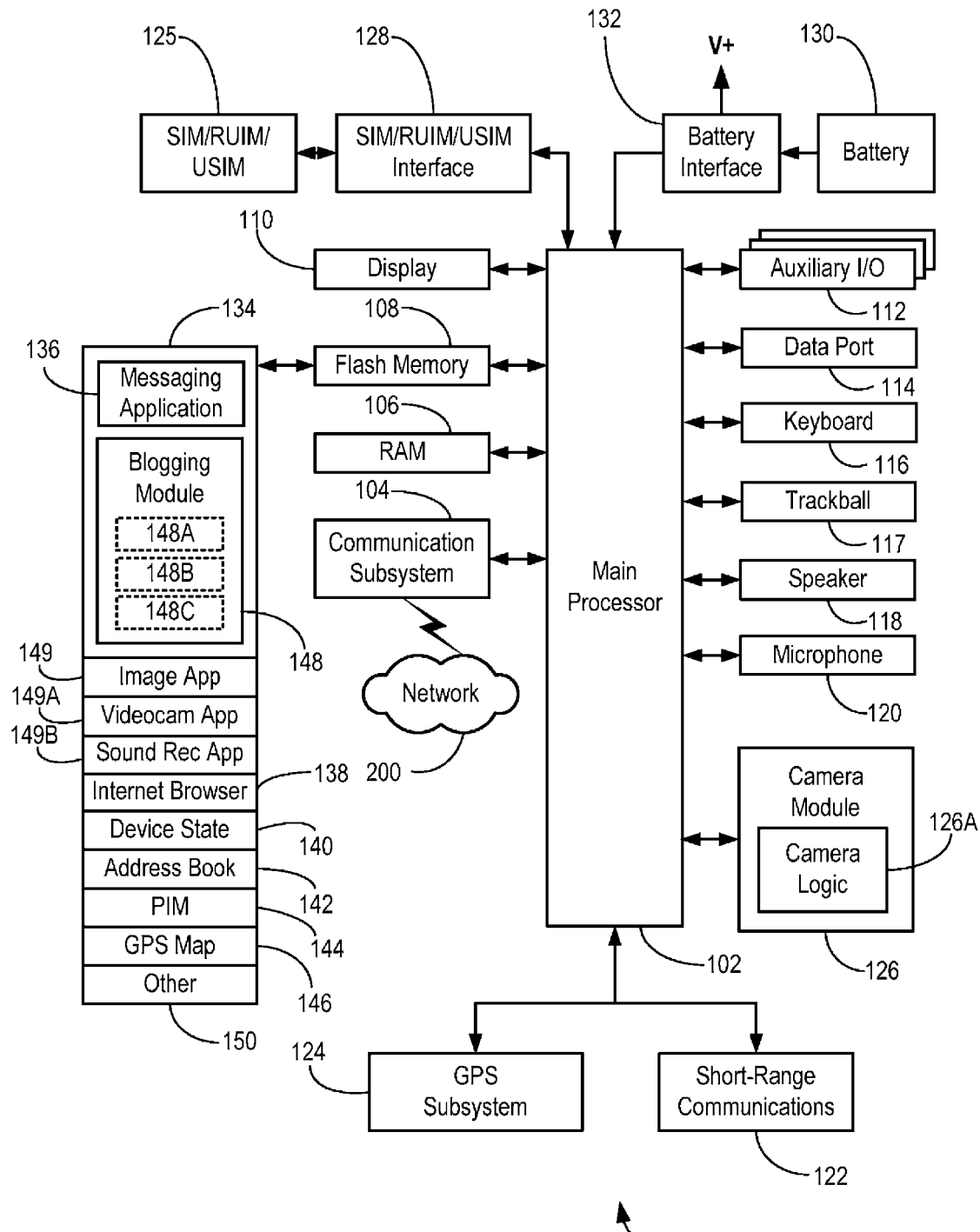
FIG. 1 is a block diagram of an illustrative example of a wireless mobile device in accordance with an embodiment.

In an illustrative embodiment, the system and method may be practiced with a wireless mobile device in a wireless operating environment. Shown in FIG. 1 is a schematic block diagram of an illustrative wireless mobile device 100. The wireless mobile device 100 may comprise a number of components, including a main processor 102 which controls the overall operation of wireless mobile device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, GPS subsystem 124, SIM/RUIM/USIM card 125 connected via a SIM/RUIM/USIM interface 128, and a camera module 126 with camera logic 127. In some embodiments, the keyboard 116 may comprise a virtual keyboard or a physical keyboard or both. In some embodiments, the display 110 may comprise a touchscreen display.

Some of the subsystems of the wireless mobile device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing for the trackball to be depressed, to allow selection of a highlighted item.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The wireless mobile device 100 may send and receive communication signals over the wireless network 200 after required network registration or activation procedures have been completed. Network access may be associated with a subscriber or user of the wireless mobile device 100.

The wireless mobile device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the wireless mobile device 100. The battery 130 may be used to power all components and modules in the wireless mobile device 100. In some embodiments, the communication device 100 may be solar powered or otherwise powered with or without use of a battery.

The main processor 102, in addition to its operating system functions, enables execution of various software applications 134 on the wireless mobile device 100. A subset of software applications 134 that control basic device operations, including data and voice communication applications, will normally be installed on the wireless mobile device 100 during its manufacture.

The software applications 134 may include a messaging application 136. The messaging application 136 can be any suitable software program that allows a subscriber or user of the wireless mobile device 100 to send and receive wireless text communications. Various alternatives exist for the messaging application 136 as is well known to those skilled in the art. Messages that have been sent or received by the user are typically stored in local storage such as flash memory 108 of the wireless mobile device 100, or in some other suitable storage element in the wireless mobile device 100. In an alternative embodiment, some of the sent and received messages may be stored remotely from the wireless mobile device 100 such as in a data store of an associated host system that the wireless mobile device 100 communicates with. In an embodiment, the messaging application 136 may include a Message List user interface that is configured to allow a user to see a list of message objects (i.e. email messages) in a convenient list form. This will be described in detail further below.

To identify a user, the communications device 100 may use a SIM/RUIM/USIM card 125 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 125 is one type of a conventional "smart card" that can be used to identify a user of the communications device 100 and to personalize the communications device 100, among other things. Without the SIM/RUIM/USIM card 125, the communications device 100 may not be fully operational for communication with the wireless network 200, in some embodiments. By inserting the SIM/RUIM/USIM card 125 into the SIM/RUIM/USIM interface 128, a user can access subscribed services. Such subscribed services may include, for example, web browsing and messaging such as email, voice mail, Short Message Service (SMS), and Multimedia Messaging Services (MMS).

Camera module 126 may be adapted to capture a still or video image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 126A to focus an image onto the CCD or CMOS sensor array. The size and pixel density of the CCD or CMOS sensor array may be suitably selected for the image resolution required for a particular application. Camera logic 126A may also control the camera lens aperture and/or shutter speed by incorporating a suitable light exposure meter. Image capture using camera module 126 and image application 149 may be initiated by a user controlling a dedicated camera shutter, or a context dependent programmable button or key (on keyboard 116, for example) that may act as a camera shutter button. Image application module 149 is also adapted to perform various other functions on captured images and video clips including processing, display, playback and storage. In an embodiment, image application module 149 may access microphone 120 to record sound together with a video clip to create an audio-visual piece, or record sound clips separately for sound only. In another embodiment, the video clip or sound clip may be controlled using function-specific application modules, such as a video camera application module 149A for recording the video clips, or sound recorder application module 149B for recording sound or voice.

Still referring to FIG. 1, wireless mobile device 100 may include a blogging module 148 that may be operatively integrated with main processor 102, RAM 106, display 110, messaging application 136, Internet browser 138, image application module 149, GPS Subsystem 124, and various other device subsystems and software applications. In an embodiment, GPS subsystem 124 may be integrated with camera module 126 and image application module 149 to provide geographic coordinates at the time of image capture, which may correspond with the time at which a draft blog entry is created. Blogging module 148 functions will be described in more detail further below.

The wireless mobile device 100 may further include a device state module 140, an address book module 142, a Personal Information Manager (PIM) module 144, and various other modules 150. Additional software applications may also be loaded onto the wireless mobile device 100 through at least one of the wireless network 200, the auxiliary I/O subsystem 112, the data port 114, the short-range communications subsystem 122, or the various other device subsystems 124.

Figure 2:
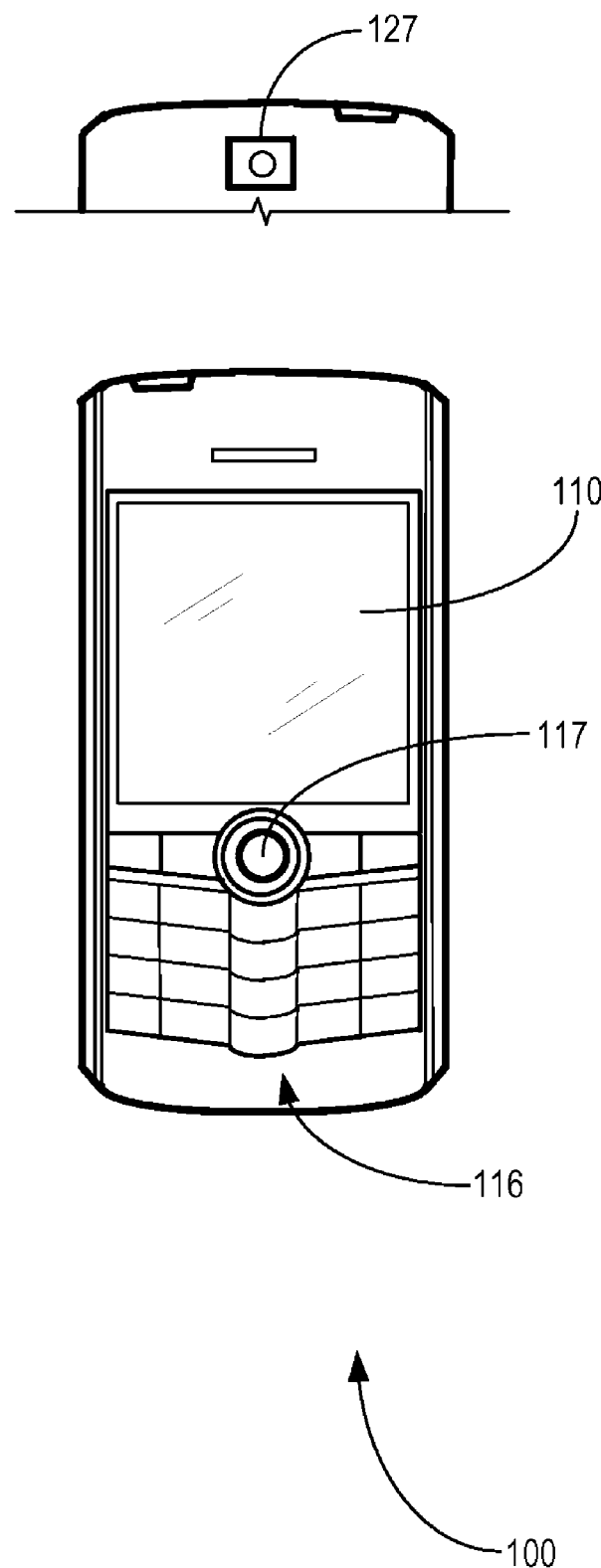
FIG. 2 is an illustrative example of a wireless mobile device that may include the various components and modules of FIG. 1.

Now referring to FIG. 2, shown is an illustrative front view of a wireless mobile device 100 that may provide a suitable operating environment. In this particular example, mobile communication device 100 comprises a handheld smart phone; however, the scope of the present disclosure is not limited to a specific type of device. As shown, the wireless mobile device 100 may include a display 110, a keyboard 116, and other input or navigation means such as a trackball 117. The display 110 may be configured to display various screens allowing the user of device 100 to view screen outputs from the various software applications 134, including the blogging module 148. Display 110 may also be configured to provide a touch-sensitive screen input in response to a prompt or query displayed on display 110. A camera lens 127 may be provided on the back of wireless mobile device 100 to facilitate capture of an image or video by camera module 126 and camera logic 126A.

Figure 3:
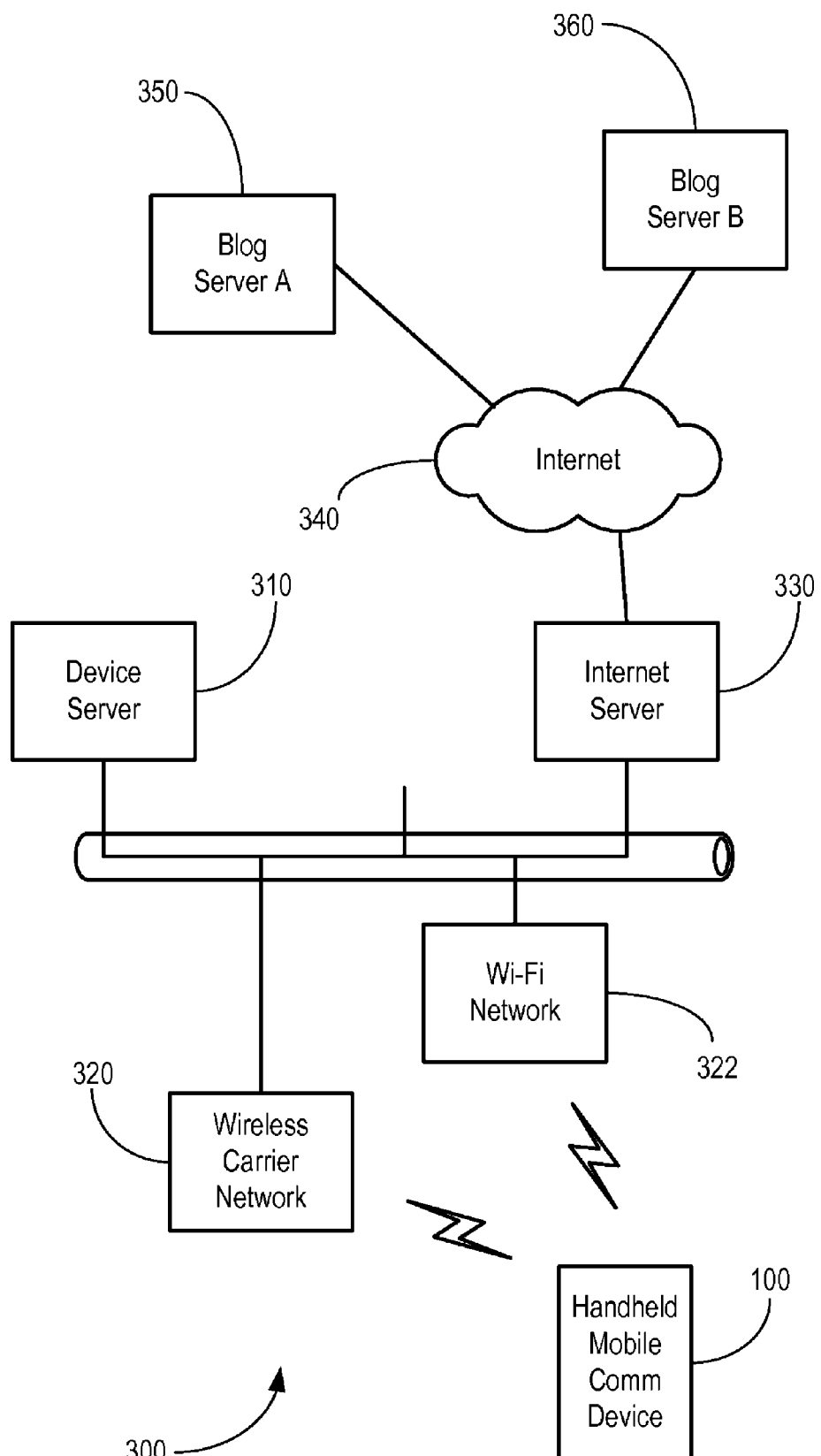
FIG. 3 is a block diagram of an illustrative example of a network environment in which various embodiments may be practiced.

Now referring to FIG. 3, shown is a schematic block diagram of an illustrative network environment 300 in which various embodiments may be practiced. As shown, network environment 300 may include a device server 310 operatively connected to the wireless mobile device 100 via a wireless carrier network 320, a Wi-Fi Network 322, or another suitable access point. Any data transferred between device server 310 and wireless mobile device 100 may be encrypted using algorithms such as Triple Data Encryption Standard (Triple DES) and Advanced Encryption Standard (AES) to secure wireless communications.

An Internet server 330 may also be provided in the network environment 300 such that device 100 may access the Internet 340. The Internet 340 provides access to blog servers 350, 360 which may host one or more blogs maintained by the user of wireless mobile device 100. As will be explained in more detail below, blogs hosted on blog servers 350, 360 may be accessed for reading and writing to on wireless mobile device 100 using blogging module 148.

In an embodiment, blogging module 148 is adapted to allow a user to write a blog entry on wireless mobile device 100 for upload to one of the blog servers 350, 360. As described above, blogging module 148 is operatively integrated with various components, subsystems and software applications in wireless mobile device 100. With this integration, blogging module 148 is adapted to provide a simplified user interface for reading, writing and managing blog entries, and may facilitate automated drafting of blog entries upon occurrence of certain pre-determined triggering events.

Figure 4A:
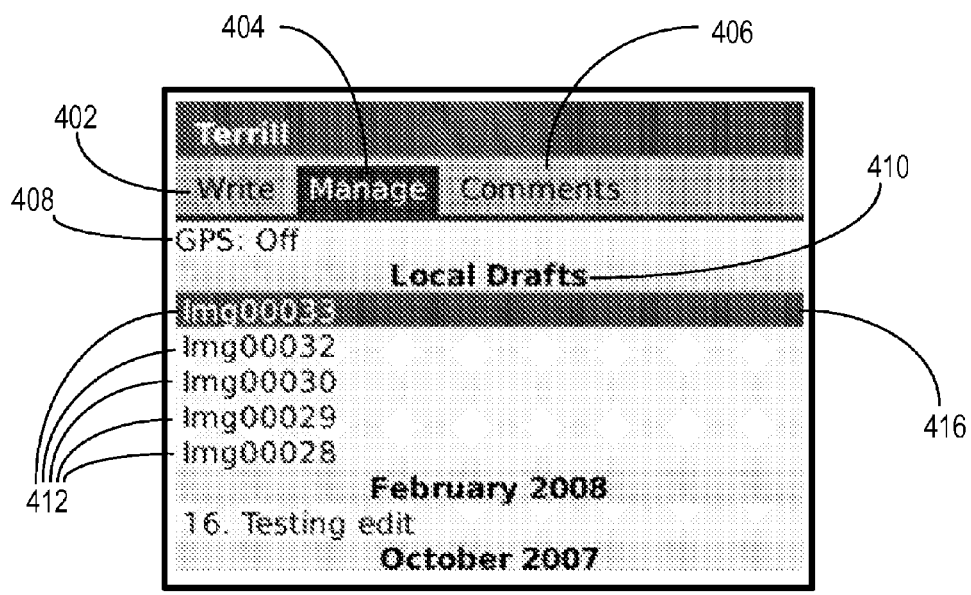
FIGS. 4A to 4D show illustrative examples of user interface screens in accordance with an embodiment.

Now referring to FIG. 4A, shown is an illustrative blogging module user interface screen 400A. As shown, screen 400A includes a menu bar with a number of menu options including Write 402, Manage 404, and Comments 406. In screen 400A, Manage 404 is currently selected, allowing the user to view and manage a list of draft blog entries 412 which have been saved as local drafts, as indicated at 410. "Img00033" is currently selected, as shown by highlighting 416.

Also shown in screen 400A is a GPS status indicator 408 showing that the GPS function of wireless mobile device 100 is currently off. In an embodiment, blogging module 148 and GPS subsystem 124 may be integrated such that one or more of GPS coordinates, speed and direction may be captured at the time of writing a blog entry. GPS subsystem 124 may provide the GPS coordinates, speed and direction at the geographic location that each blog entry 412 was first created. The speed and direction may be calculated from the rate of change of GPS coordinates and the direction of the change, and is applicable if the wireless mobile device 100 is in motion at the time (e.g. on a train or in a car). The GPS coordinates, speed and direction data may then be stored together with the blog entry for use in various applications. In another embodiment, GPS subsystem 124 may be adapted to provide a reverse GPS lookup by referring to GPS Map 146 for a location name corresponding to the geographic coordinates. This location name may then be stored together with the blog entry for use in various applications. An illustrative application of GPS integration with blogging module 148 will be discussed in more detail further below.

In an embodiment, blogging module 148 may be adapted to automatically generate a draft blog entry upon occurrence of a triggering event. The triggering event(s) may be predefined so that the blogging module 148 monitors for occurrence of such events when placed into an auto-drafting mode. For example, when blogging module 148 is placed into an auto-draft mode, taking an image with camera module 126 may trigger blogging module 148 to automatically draft a blog entry. As another example, the triggering event may comprise capturing a video clip with sound using camera module 126 and microphone 120. Another example of a triggering event may comprise capturing a sound clip such as a voice note without an accompanying image or video clip using sound recorder application 149B.

In the example shown in screen 400A, the draft blog entries 412 may be named according to the image name assigned by camera module 126, for example. For each draft blog entry 412, blogging module 148 may be adapted to copy the captured image into the draft and also insert automatically generated text in a predetermined format. Automatic insertion of text will be discussed in more detail further below. If the GPS feature is turned on, then the GPS coordinates of the location at which blogging module 148 is triggered to generate a draft blog entry may be saved together with the draft blog entry 412. As previously discussed, a reverse GPS lookup function may be used to retrieve a location name corresponding to the GPS coordinates, and this location name may be saved together with the draft blog entry 412. An illustrative GPS application is discussed further below.

Figure 4B:
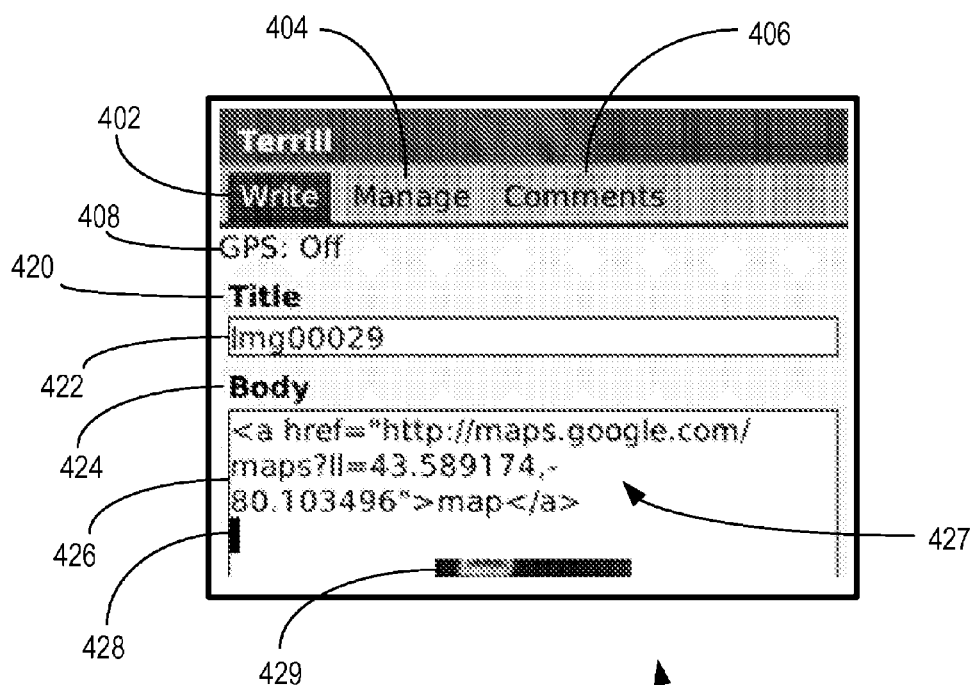

In an embodiment, blogging module 148 is adapted such that draft blog entries 412 may be edited prior to being posted. By way of example, as shown in FIG. 4B, screen 400B shows a draft blog entry 412 entitled "Img00029" currently being edited. The date and time that "Img2029" was captured may also be automatically included. Screen 400B also shows menu option Write 402 selected, and also shows input fields for a Title 420, title field 422, and a Body. Body input field 426 is shown with some text 427 that has been inserted into the body input field 426, and cursor 428 shows the current input position. A top part of an image 429 is also shown in body input field 426, indicating that body input field is adapted to receive images as well as text. As will be appreciated, as draft blog entries 412 may be edited prior to being posted, they may be uploaded for posting after the actual triggering event or sequence of triggering events.

In an embodiment, in an auto-drafting mode, text 427 may be created automatically for insertion into body input field 426 when creating a draft blog entry 412. The inserted text 427 may be standard text inserted for all draft blog entries 412, or may be text specific to data relating to the triggering event. For example, the generated text may include a URL, filename, or other information specific to the triggering event.

In an embodiment, the triggering event itself may comprise visiting a webpage and obtaining the webpage URL and title, if any, extracted from the webpage HTML. In one embodiment, the trigger may comprise loading a webpage having a URL. In another embodiment, the trigger may be based on browsing the webpage for at least a predetermined threshold time period, which may be configurable according to user preference. If the user spends very little time on a webpage before clicking to the next page or closing the browser, then the web page may be an index page or other page that would not be of interest for the blog, and therefore a draft blog entry is not created.

In this case, when blogging module 148 is placed into an auto-draft mode, visiting a number of webpages in sequence may trigger the automatic generation of draft blog pages to be created for the last X webpages, wherein X is a predetermined number which may be set to a default number, such as 10, for example, and which may be modified according to user preference, in some embodiments.

Figure 4C:
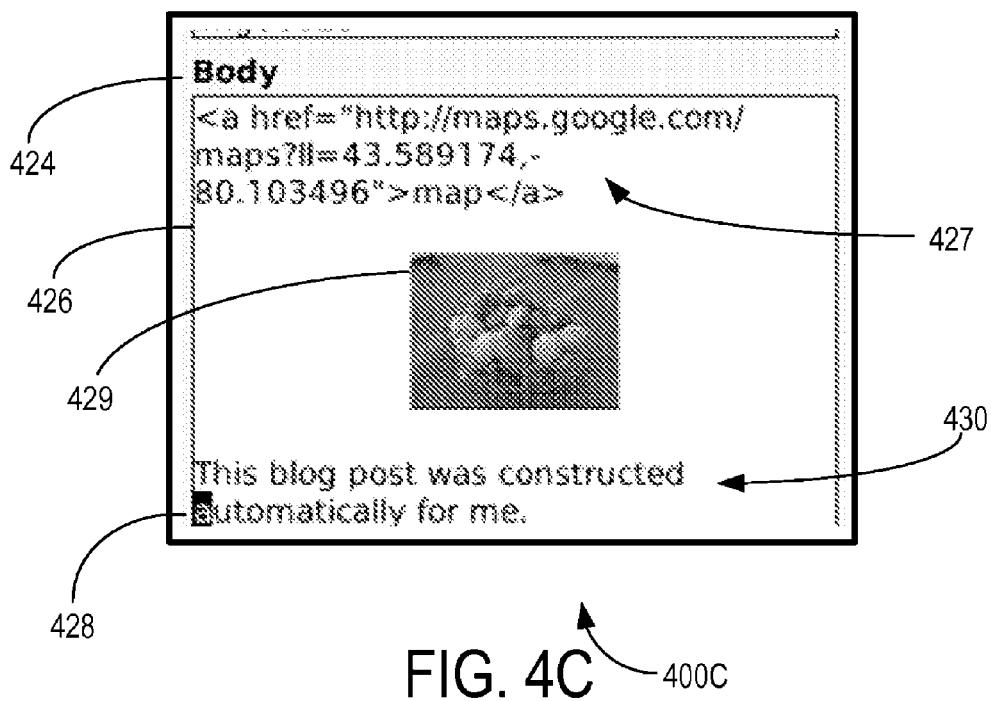

Now referring to FIG. 4C, shown is another illustrative blogging module user interface screen 400C, which in the illustrative example is screen 400B of FIG. 4B which has been scrolled down (e.g. using trackball 117) to show more of body input field 426. As shown, image 429 is now fully displayed in body input field 426. FIG. 4C further includes text 430 appearing in body input field 426 below image 429, and cursor 428 appearing in position over the additional text 430. The text 430 may comprise standard text that is automatically inserted for every draft blog entry 412, but this may be edited or deleted as desired.

Figure 4D:
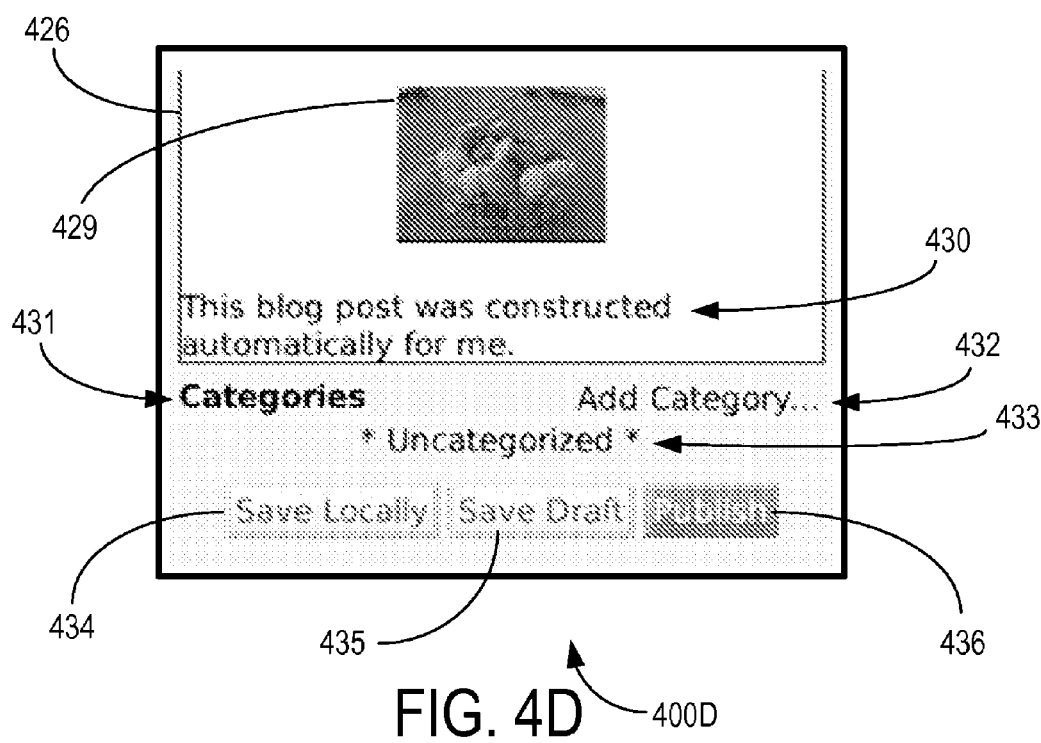

Now referring to FIG. 4D, shown is another illustrative blogging module user interface screen 400D, which in this illustrative example is this screen 400C of FIG. 4C which has been scrolled down further. As shown in screen 400D, a "Categories" label 431 appears below body input field 426. A user selectable option at 432 to "Add Category . . . " is also shown below body input field 426 towards the right. There is also a category status at 433 indicating that the blog entry is currently "Uncategorized". These categories may be defined by the blogs on blog servers 350, 360, or may be user defined to define a new category. If a category is selected, the selected category is saved with the draft blog entry 412.

Figure 5A:
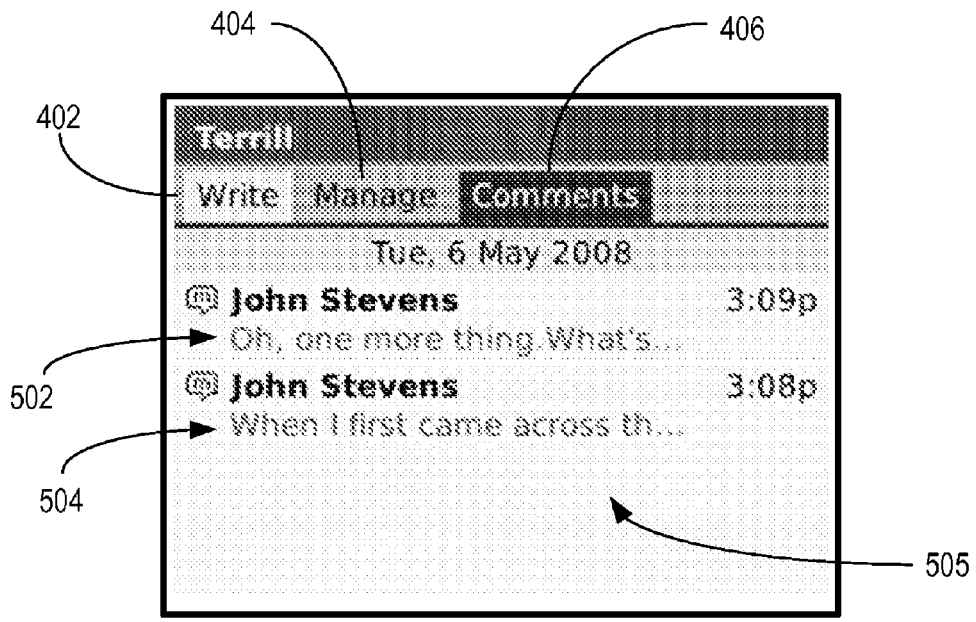
FIGS. 5A and 5D show additional illustrative examples of user interface screens in accordance with an embodiment.

Now referring to FIG. 5A, shown is an illustrative blogging comment moderation user interface screen 500A in which the Comments 406 menu option is selected. As shown a reader named John Stevens has sent two comments 502, 504 in response to a blog posted by the blogger. In an embodiment, these comments 502, 504 may be sent to the blogger in an e-mail message format to be received by blogging module 148, and listed in a list 505 when Comments 406 is the selected menu option. Blogging module 148 may be further adapted to provide a locally generated user interface (i.e. the application and user interface originates on the wireless mobile device 100) for viewing and moderating the comments. This is now described in more detail.

Figure 5B:
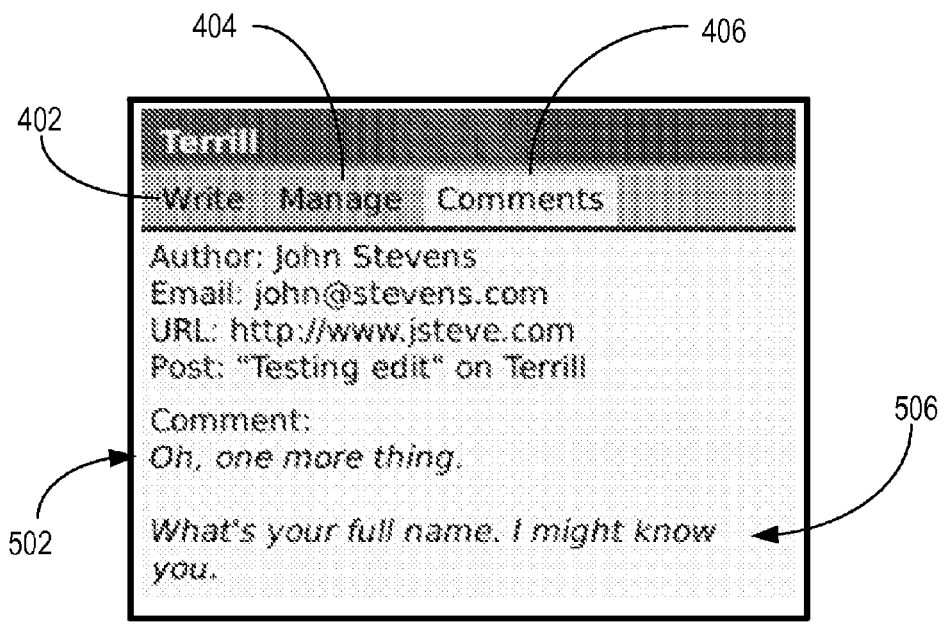

FIG. 5B, shows an illustrative blogging comment moderation user interface screen 500B in which one of the comments 502 has been opened for viewing the full text 506. In addition to the comments, other information such as the Author of the comment, the originating email address, the sending URL, and the blog post to which the comment relates may also be shown.

Figure 5C:
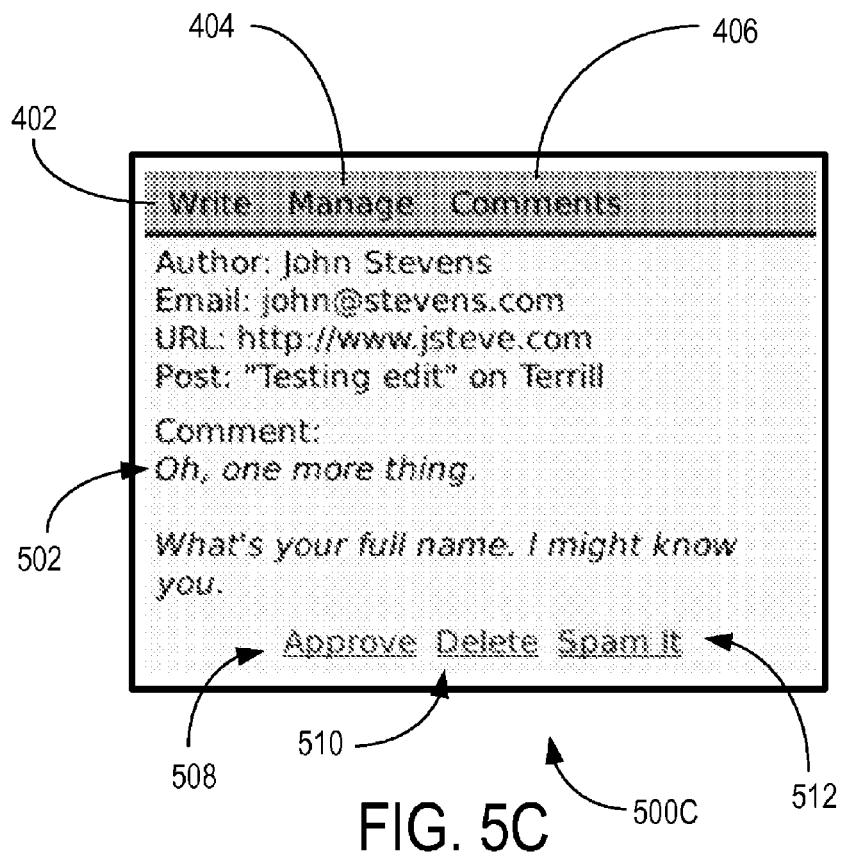

FIG. 5C shows another illustrative blogging comment moderation user interface screen 500C which is screen 500B of FIG. 5B scrolled further down. As shown, options are provided at the bottom of screen 500C to Approve 508, 510, or identify as spam 512 in the comments received from John Stevens. This allows the blogger to approve the blog message for posting, delete the blog, or to mark this comment received from reader John Stevens as spam. In FIG. 5C, the spam option is selected. Thus, this comment is not approved for posting to the blog, and the email address from which the comment originates may be blocked.

Figure 5D:
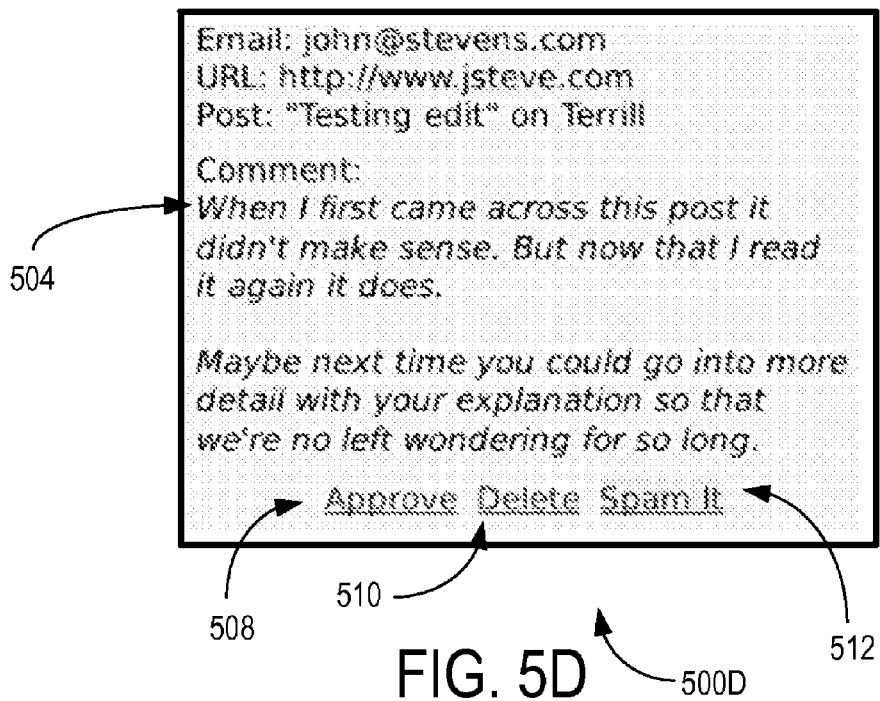

FIG. 5D shows another illustrative blogging comment moderation user interface screen 500D displaying a second comment 504 from reader John Stevens. Again, the blogger can approve, delete or mark as spam the second comment 504.

Comments received by blogging module 148 may thus be immediately reviewed by a blogger to receive feedback from a recent blog post. Furthermore, using a comment moderation user interface locally resident on the wireless mobile device 100 allows the comments to be quickly moderated and posted to the blog or deleted.

Figure 6:
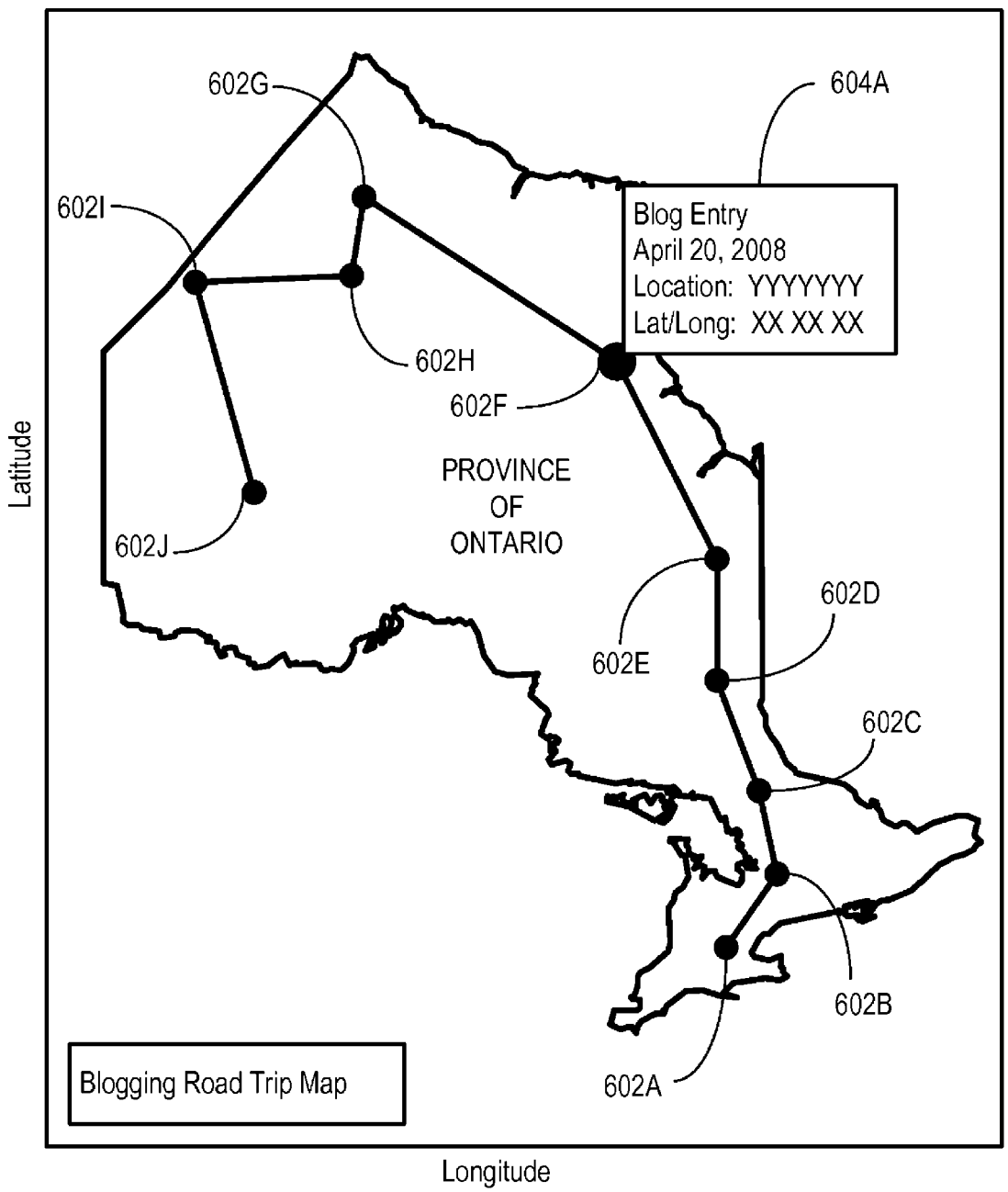
FIG. 6 is an illustrative example of a blogging tour route map in accordance with an embodiment.

Now referring to FIG. 6, in an illustrative embodiment, GPS coordinates stored with each blog entry (as previously described) may be used to create a blogging tour route map 600, where each location of a blog entry is indicated by a node 602A-602J. In another embodiment, location information may be based on triangulation of cellular base stations, or based on a relative location such as distance and direction from a prior location. In an embodiment, these nodes 602A-602J are logically connected in sequence by paths, to indicate the order of the blog entries. A number at each node may provide the order in which the nodes are connected, or alternatively a date and time stamp may be shown adjacent each node, or shown upon hovering a pointer over the node. It will be appreciated, however, that these paths may not be aligned with the actual physical route taken between locations where blog entries were made. Rather, they show graphically the sequence of blog entries made over the course of a tour.

In an embodiment, each node 602A-602J appearing on route map 600 may be associated with a blog entry such that, by hovering over or selecting a node (node 602F for example), data associated with the blog entry such as corresponding label (604F) appears. The label 604F may provide, for example, the blog entry date, time, the location name, and GPS coordinates of that location. Alternatively, selecting a node may cause the associated blog entry to open for viewing. By presenting blog entries in this manner, a reader can follow the blog entries graphically, and get an approximate sense of the route and timeline associated with the blogging tour.

Figure 7:
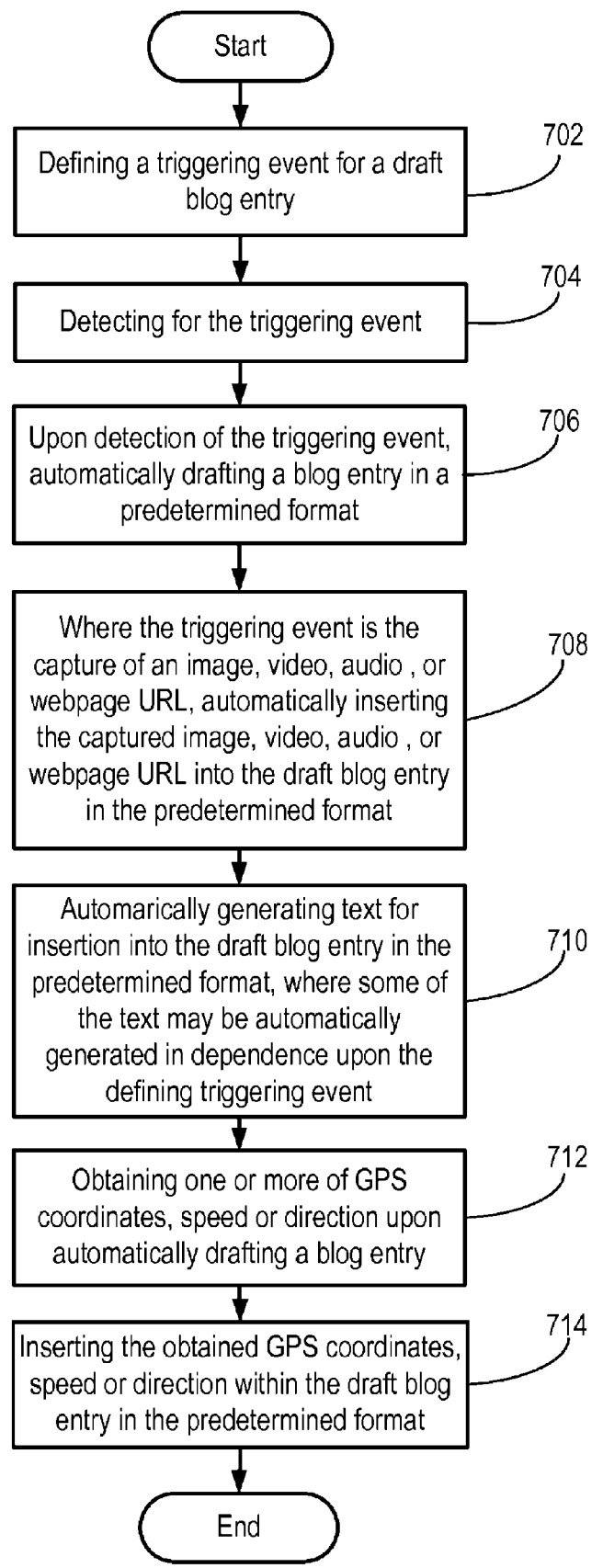
FIG. 7 shows a schematic flow chart of a method in accordance with an embodiment.

Now referring to FIG. 7, shown is a schematic flow chart of an illustrative method 700 in accordance with an embodiment. As shown, method 700 begins at block 702 where method 700 defines a triggering events for a draft blog entry. Method 700 then proceeds to block 704, where method 700 detects for the triggering event.

At block 706, upon detection of the triggering event, method 700 automatically drafts a blog entry in a predetermined format.

For example, if the triggering event is the capturing of an image, method 700 proceeds to block 708 where method 700 automatically inserts the captured image into the draft blog entry in the predetermined format.

Method 700 may then proceed to block 710, where method 700 automatically generates text for insertion into the draft blog entry in the predetermined format. Some of the text may be automatically generated independence upon the defining triggering event.

Method 700 may then proceed to block 712, where method 700 obtains GPS coordinates upon the automatically drafting a blog entry. Method 700 then proceeds to block 714 and inserts the obtained GPS coordinates within the draft blog entry in the predetermined format. Method 700 then ends.

Figure 8:
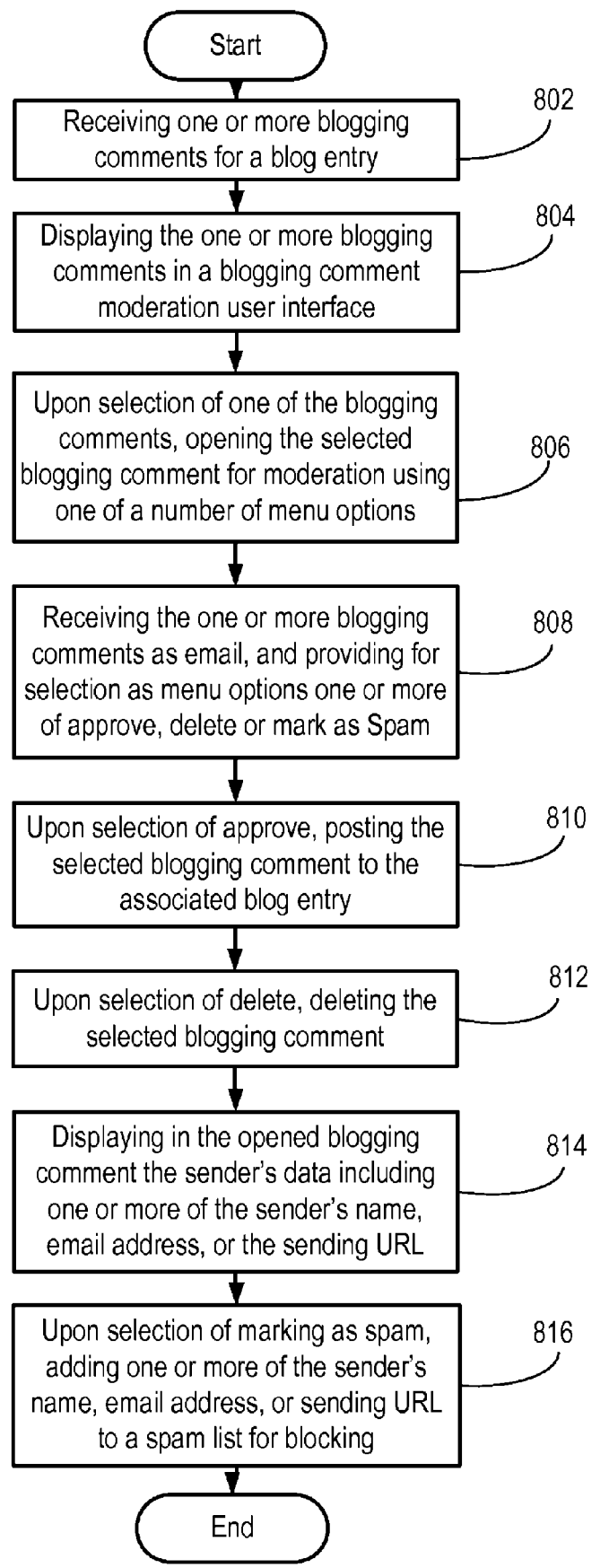
FIG. 8 shows a schematic flow chart of another method in accordance with an embodiment.

Now referring to FIG. 8, shown is a schematic flow chart of an illustrative method 800 in accordance with an embodiment. As shown, at that 800 begins at block 802 where method 800 receives one or more blocking comments for any blog entry.

Method 800 then proceeds to block 804, where method 800 displays of the one or more blocking comments in a blogging comment moderation user interface.

Method 800 then proceeds to block 808 where, upon selection of one of the blogging comments, method 800 opens the selected blogging comment for moderation using one of a number of menu options.

Method 800 then proceeds to block 808, where method 800 receives the one or more blocking comments as e-mail, and provides for selection as menu options one or more of approve, delete or mark as spam.

Method 800 then proceeds to block 810, where upon selection of approve, method 800 posts the selected blogging comments to the associated blog entry.

Method 800 then proceeds to block 812, where upon selection of delete, method 800 delete as the selected blogging comment.

Method 800 then proceeds to block 814, where method 800 displays in the opened blocking comments the sender's data including one or more of the sender's name, e-mail address, or the sending URL.

Method 800 then proceeds to block 816, where upon selection of marking as spam, method 800 and so one or more of the sender's name, e-mail address, or sending URL to a spam list for blocking. Method 800 then ends.

Thus, in an aspect, there is provided a method executable on a wireless mobile device for automatically drafting blog entries, comprising: defining a triggering event for generating a draft blog entry; detecting the triggering event; and upon detection of the triggering event, automatically generating the draft blog entry in a predetermined format.

In an embodiment, the triggering event comprises capturing an image, video clip, sound clip, or browsing a webpage having a URL on the wireless mobile device, and the method further comprises automatically inserting the captured image, video clip, sound clip or webpage URL into the draft blog entry in the predetermined format.

In another embodiment, the method further comprises automatically generating text for insertion into the draft blog entry in the predetermined format.

In another embodiment, some of the text is generated in dependence upon data relating to the defined triggering event.

In another embodiment, the method further comprises providing a user interface for editing the automatically generated text prior to posting the draft blog entry.

In another embodiment, the method further comprises uploading the draft blog entry for posting to a web site, in response to receipt of a user input. The uploading may occur in response to a user-initiated request subsequent to the generation of the draft blog entry. For example, the generation of the draft blog entry or entries may occur when the device is not in wireless coverage, such as when the device is being an airplane or subway. Sending the draft blog entry or entries can be delayed to a time at which the device is back in coverage, or a time at which the device is in an area of free wireless coverage, for example. As another example, the generation of the draft blog entry or entries may occur while the user is travelling on vacation, and the user can advantageously postpone editing and posting the draft blog entry or entries to a later time that is more convenient to the user, such as the end of the day or when the user is waiting in line for a tour, for example.

In another embodiment, the method further comprises: obtaining one or more of GPS coordinates, speed or direction upon automatically generating a draft blog entry; and storing the obtained GPS coordinates, speed or direction within the draft blog entry in the predetermined format.

In another embodiment, the method further comprises generating a blogging tour map based on the GPS coordinates inserted into a plurality of draft blog entries, the blogging tour map comprising a plurality of nodes, each node representing a blog entry, and connected by paths to indicate an order of blog entries.

In another embodiment, the method further comprises providing selectable nodes in the blogging tour map, each selectable node linked to a corresponding draft blog entry and adapted to display data relating to the corresponding draft blog entry.

In another aspect, there is provided a system for automatically drafting blog entries on a wireless mobile device, the system including processing means and memory adapted to: define a triggering event for generating a draft blog entry; detect the triggering event; and upon detection of the triggering event, automatically generate a draft blog entry in a predetermined format.

In an embodiment, the triggering event comprises capturing an image, video clip, sound clip, or browsing a webpage having a URL on the wireless mobile device, and the system is further adapted to automatically insert the captured image, video clip, sound clip, or visiting a webpage URL into the draft blog entry in the predetermined format.

In another embodiment, the system is further adapted to automatically generate text for insertion into the draft blog entry in the predetermined format.

In another embodiment, the system is further adapted to generate some of the text in dependence upon the defined triggering event.

In another embodiment, the system is further adapted to provide a user interface for editing the automatically generated text prior to posting the draft blog entry.

In another embodiment, the system is further adapted to upload the draft blog entry for posting to a website.

In another embodiment, the system is further adapted to: obtain one or more of GPS coordinates, speed or direction upon automatically generating a draft blog entry; and store the obtained GPS coordinates within the draft blog entry in the predetermined format.

In another embodiment, the system is further adapted to generate a blogging tour map based on the GPS coordinates inserted into a plurality of draft blog entries, the blogging tour map comprising a plurality of nodes, each node representing a blog entry, and connected by paths to indicate the order of blog entries.

In another embodiment, the system is further adapted to provide selectable nodes in the blogging tour map, each selectable node linked to a blog entry and adapted to display data relating to the blog entry.

In another aspect, there is provided a data processor readable medium storing data processor code that when loaded into a device adapts the device to perform a method of automatically drafting blog entries, the data processor readable medium comprising: code for defining a triggering event for generating a draft blog entry; code for detecting the triggering event; and code for automatically generating a draft blog entry in a predetermined format upon detection of the triggering event.

In an embodiment, the triggering event comprises capturing an image, video clip, sound clip, or browsing a webpage having a URL on the wireless mobile device, and the data processor readable medium further comprises code for automatically inserting the captured image, video clip, sound clip, or webpage URL into the draft blog entry in the predetermined format.

In another embodiment, the data processor readable medium further comprises code for automatically generating text for insertion into the draft blog entry in the predetermined format.

In another embodiment, the data processor readable medium further comprises code for automatically generating text for insertion into the draft blog entry in the predetermined format.

In another embodiment, the data processor readable medium further comprises code for generating some of the text in dependence upon the defined triggering event.

In another embodiment, the data processor readable medium further comprises code for providing a user interface for editing the automatically generated text prior to posting the draft blog entry.

In another embodiment, the data processor readable medium further comprises: code for obtaining GPS coordinates upon automatically generating a draft blog entry; and code for storing the obtained GPS coordinates within the draft blog entry in the predetermined format.

In another embodiment, the data processor readable medium further comprises code for generating a blogging tour map based on the GPS coordinates inserted into a plurality of draft blog entries, the blogging tour map comprising a plurality of nodes, each node representing a blog entry, and connected by paths to indicate the order of blog entries.

In another embodiment, the data processor readable medium further comprises code for providing selectable nodes in the blogging tour map, each selectable node linked to a blog entry and adapted to display data relating to the blog entry.

While illustrative embodiments have been described above, it will be appreciated that various changes and modifications may be made. More generally, the scope of the invention is defined by the following claims.

We claim:

1. A method executable on a wireless mobile device for automatically drafting blog entries, the method comprising:
   detecting a triggering event for generating a draft blog entry based on a predetermined number of webpages being visited, the predetermined number of webpages being configurable according to user preference; and
   upon detection of the triggering event, automatically generating the draft blog entry in a predetermined format.

2. The method of claim 1, further comprising:
   obtaining and storing GPS coordinates, the GPS coordinates being stored at least within the draft blog entry; and
   generating a blogging tour map based on the GPS coordinates within the draft blog entry, the blogging tour map comprising a plurality of nodes, each node representing an automatically generated blog entry, and where each node is situated on at a location on the geographical map based on the GPS coordinates.

3. The method of claim 2, further comprising:
capturing at least one of an image, a video clip, and a sound clip using the wireless mobile device, and
automatically inserting the captured image, video clip or sound clip into the draft blog entry in the predetermined format.

4. The method of claim 2, further comprising:
browsing a webpage having a Uniform Resource Locator (URL) on the wireless mobile device, and
automatically inserting the URL into the draft blog entry in the predetermined format.

5. The method of claim 2, further comprising:
providing a user interface for editing the automatically generated draft blog entry prior to posting the draft blog entry; and
uploading the draft blog entry for posting on a website, in response to receipt of a user input.

6. The method of claim 2, further comprising:
obtaining one or more of GPS coordinates, speed and direction upon automatically generating a draft blog entry; and
storing the obtained one or more GPS coordinates, speed and direction within the draft blog entry in the predetermined format.

7. The method of claim 6, further comprising generating a blogging tour map based on the GPS coordinates inserted into a plurality of draft blog entries, the blogging tour map comprising a plurality of nodes, each node representing a blog entry, and connected by paths to indicate an order of blog entries.

8. The method of claim 7, further comprising providing selectable nodes in the blogging tour map, each selectable node linked to a corresponding draft blog entry and adapted to display data relating to the corresponding draft blog entry.

9. The method of claim 1, further comprising automatically generating text for insertion into the draft blog entry in the predetermined format, and wherein some of the text is generated in dependence upon data relating to the defined triggering event.

10. A system for automatically drafting blog entries on a wireless mobile device, the system comprising:
a processor coupled to a memory that is configured to:
detect a triggering event for generating a draft blog entry based on a predetermined number of webpages being visited, the predetermined number of webpages being configurable according to user preference; and
upon detection of the triggering event, automatically generating the draft blog entry in a predetermined format.

11. The system of claim 10, is further configured to
obtain and store GPS coordinates, the GPS coordinates being stored at least within the draft blog entry; and
generate a blogging tour map based on the GPS coordinates within the draft blog entry, the blogging tour map comprising a plurality of nodes, each node representing an automatically generated blog entry, and where each node is situated on at a location on the geographical map based on the GPS coordinates.

12. The system of claim 11, is further configured to
capturing at least one of an image, a video clip, and a sound clip using the wireless mobile device, and
automatically inserting the captured image, video clip or sound clip into the draft blog entry in the predetermined format.

13. The system of claim 11, further comprising:
browsing a webpage having a Uniform Resource Locator (URL) on the wireless mobile device, and
automatically inserting the URL into the draft blog entry in the predetermined format.

14. The system of claim 11, further comprising:
providing a user interface for editing the automatically generated draft blog entry prior to posting the draft blog entry; and
uploading the draft blog entry for posting on a website, in response to receipt of a user input.

15. The system of claim 11, further comprising:
obtaining one or more of GPS coordinates, speed and direction upon automatically generating a draft blog entry; and
storing the obtained one or more GPS coordinates, speed and direction within the draft blog entry in the predetermined format.

16. The system of claim 15, wherein the system is further adapted to generate a blogging tour map based on the GPS coordinates inserted into a plurality of draft blog entries, the blogging tour map comprising a plurality of nodes, each node representing a blog entry, and connected by paths to indicate the order of blog entries.

17. The system of claim 16, wherein the system is further adapted to provide selectable nodes in the blogging tour map, each selectable node linked to a blog entry and adapted to display data relating to the blog entry.

18. The system of claim 11, further comprising automatically generating text for insertion into the draft blog entry in the predetermined format, and wherein some of the text is generated in dependence upon data relating to the defined triggering event.

19. A non-transitory data processor readable medium storing data processor code that when loaded into a device adapts the device to perform a method of automatically drafting blog entries, the data processor readable medium comprising code for:
detecting a triggering event for generating a draft blog entry based on a predetermined number of webpages being visited, the predetermined number of webpages being configurable according to user preference; and
upon detection of the triggering event, automatically generating the draft blog entry in a predetermined format.

20. The data processor readable medium of claim 19, further comprising:
obtaining and storing GPS coordinates, the GPS coordinates being stored at least within the draft blog entry; and
generating a blogging tour map based on the GPS coordinates within the draft blog entry, the blogging tour map comprising a plurality of nodes, each node representing an automatically generated blog entry, and where each node is situated on at a location on the geographical map based on the GPS coordinates.

21. The data processor readable medium of claim 20, further comprising:
capturing at least one of an image, a video clip, and a sound clip using the wireless mobile device, and
automatically inserting the captured image, video clip or sound clip into the draft blog entry in the predetermined format.

22. The data processor readable medium of claim 20, further comprising:
browsing a webpage having a Uniform Resource Locator (URL) on the wireless mobile device, and
automatically inserting the URL into the draft blog entry in the predetermined format.

23. The data processor readable medium of claim 20, further comprising:
provising a user interface for editing the automatically generated draft blog entry prior to posting the draft blog entry; and
uploading the draft blog entry for posting on a website, in response to receipt of a user input.

24. The data processor readable medium of claim 20, further comprising:
obtaining one or more of GPS coordinates, speed and direction upon automatically generating a draft blog entry; and
storing the obtained one or more GPS coordinates, speed and direction within the draft blog entry in the predetermined format.

25. The data processor readable medium of claim 24, further comprising generating a blogging tour map based on the GPS coordinates inserted into a plurality of draft blog entries, the blogging tour map comprising a plurality of nodes, each node representing a blog entry, and connected by paths to indicate an order of blog entries.

26. The data processor readable medium of claim 25, further comprising providing selectable nodes in the blogging tour map, each selectable node linked to a corresponding draft blog entry and adapted to display data relating to the corresponding draft blog entry.

\* \* \* \* \*